United States Patent [19]

Minamisawa et al.

[11] Patent Number: 4,874,800

[45] Date of Patent: Oct. 17, 1989

[54] POLYESTER RESIN COMPOSITION

[75] Inventors: Tsuyoshi Minamisawa, Mishima; Katsunori Endo, Fuji; Eitaro Ikegami, Fuji; Shigeru Nezu, Fuji, all of Japan

[73] Assignee: Polyplastics Co., Ltd., Osaka, Japan

[21] Appl. No.: 108,962

[22] Filed: Oct. 16, 1987

[30] Foreign Application Priority Data

Oct. 17, 1986 [JP] Japan ................................ 61-247098

[51] Int. Cl.$^4$ ............................ C08K 9/04; C08K 3/04
[52] U.S. Cl. .................................... 523/205; 523/209; 524/538
[58] Field of Search ................ 523/205, 209; 524/538; 525/425

[56] References Cited

U.S. PATENT DOCUMENTS

| | | | |
|---|---|---|---|
| 4,439,578 | 3/1984 | Kim et al. | 524/538 |
| 4,565,850 | 1/1986 | Prevorsek et al. | 525/425 |
| 4,726,998 | 2/1988 | Ikenaga et al. | 428/480 |
| 4,728,698 | 3/1988 | Isayev et al. | 525/425 |

*Primary Examiner*—Lewis T. Jacobs
*Attorney, Agent, or Firm*—Birch, Stewart, Kolasch & Birch

[57] ABSTRACT

A polyester composition which comprises a blend of polyester being capable of forming an anisotropic phase in the molten state and being melt-processable, a filler and a polyamide and is improved in mechanical strength and thermal stability properties. It is easy to blend the filler with the polyester, if the filler is treated with the polyamide, prior to the blending step.

17 Claims, No Drawings

POLYESTER RESIN COMPOSITION

BACKGROUND OF THE INVENTION

1. Field Of The Invention

The present invention relates to a melt-processable polyester resin composition capable of forming an anisotropic molten phase, said composition being superior in mechanical and thermal properties.

2. Discussion Of Related Art

A melt-processable polyester capable of forming an anisotropic molten phase (referred to hereinafter as liquid-crystalline polyester) is an entirely new material which has been attracting attention due to its outstanding characteristics which includes thermal properties, heat stability, chemical resistance, ease of molding, small molding shrinkage, and low coefficient of linear expansion. Because of these characteristic features, it has been found to be useful in the manufacture of audio equipment parts, automotive parts, and electric parts.

Liquid-crystalline polyester as such can be processed into the above-mentioned articles; but it is often used in combination with a variety of reinforcements or fillers improve its properties. However, there is still room for improvement in the mechanical properties, thermal stability, and filler handling of the liquid-crystalline polyester.

It is known in the prior art that resins, other than the liquid-crystalline polymer, such as polybutylene phthalate, has been blended with a filler and a surface-testing agent such as an epoxy resin and polyvinyl alcohol.

SUMMARY OF THE INVENTION

The present invention relates to an improvement of the liquid-crystalline polymer as to its mechanical strength and thermal properties, without impairing the other physical properties thereof and in the blending operation thereof with a filler.

A polyester composition of the present invention comprises a polyester having an anisotropic phase, 1 to 70 percent by weight, based on the composition, of a filler and 0.05 to 20 percent by weight, based on the filler, of a polyamide. The polyamide serves to collect on the surface or serves to treat the surface of the filler. In order to enhance the effect of the present invention, it is preferable that the filler is treated with the polyamide and then blended with the polyester. Accordingly, it is easy to blend the filler with the polyester, if the filler is treated with the polyamide prior to the blending step.

Accordingly, it is an object of the present invention to provide a polyester resin composition which comprises a melt-processable polyester capable of forming an anisotropic molten phase, a filler, and a polyamide resin, which serves as a surface treating agent, a collecting agent, or an additive.

The liquid-crystalline polyester used in the present invention is a melt-processable polyester having such characteristic properties that the polymer molecule chains are regularly oriented parallel to one another in the molten state. The state of the molecules so oriented is referred to as the liquid-crystal state or the nematic phase of liquid crystal substance. A polymer so defined is composed of monomers which are long and narrow, flat, and rigid along the long axis of the molecule and have a plurality of chain extension bonds coaxial or parallel to one another.

The properties of the anisotropic molten phase can be determined by an ordinary polarization test using crossed nicols. More particularly, the properties can be determined with a Leitz polarizing microscope of 40 magnifications by observing a sample placed on a Leitz hot stage in a nitrogen atmosphere. The polymer is optically anisotropic. Namely, it transmits a light when it is placed in between the crossed nicols. When the sample is optically anisotropic, the polarized light can be transmitted through the sample even when it is in a still state.

The constituents of the polymer forming the above-mentioned anisotropic molten phase are as follows:

(1) one or more of aromatic and alicyclic dicarboxylic acids,
(2) one or more of aromatic, alicyclic, and aliphatic diols,
(3) one or more of aromatic hydroxycarboxylic acids,
(4) one or more of aromatic thiolcarboxylic acids,
(5) one or more of aromatic dithiols and aromatic thiolphenols, and
(6) one or more of aromatic hydroxyamines and aromatic diamines.

The polymers forming the anisotropic molten phase comprise the following combinations:

(I) a polyester comprising (1) and (2),
(II) a polyester comprising only (3),
(III) a polyester comprising (1), (2), and (3),
(IV) a polythiol ester comprising only (4),
(V) a polythiol ester comprising (1) and (5),
(VI) a polythiol ester comprising (1), (4), and (5),
(VII) a polyester amide comprising (1), (3), and (6), and
(VIII) a polyesteramide comprising (1), (2), (3), and (6).

In addition to the above-mentioned combinations of components, the polymers forming the anisotropic molten phase also include aromatic polyazomethines such as poly(nitrilo-2-methyl-1,4-phenylenenitriloethylidine-1,4-phenylenethylidine), poly(nitrilo-2-methyl-1,4-phenylenenitrilomethylidine-1,4-phenylenemethylidine) and poly(nitrilo-2-chloro-1,4-phenyleneitrilomethylidine-1,4-phenylenemethylidine).

Further, in addition to the above-mentioned combinations of components, the polymers forming the anisotropic molten phase include polyester carbonates essentially comprising 4-hydroxybenzoyl, dihydroxyphenyl, dihydroxycarbonyl, and terephthaloyl units.

Examples of the compounds constituting the above-mentioned polymers (I) to (VIII) include aromatic dicarboxylic acids such as terephthalic acid, 4,4'-diphenyldicarboxylic acid, 4,4'-triphenyldicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and naphthalene-1,6-dicarboxylic acid; and those substituted with alkyl and alkoxy groups and halogen atoms, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Examples of the alicyclic dicarboxylic acids include trans-1,4-cyclohexanedicarboxylic acid, cis-1,4-cyclohexanedicarboxylic acid, and 1,3-cyclohexanedicarboxylic acid as well as those substituted with alkyl and alkoxy groups and halogen atoms, such as trans-1,4-(1-methyl)cyclohexane dicarboxylic acid and trans-1,4-(1-chloro)cyclohexanedicarboxylic acid.

Examples of the aromatic diols include hydroquinone, resorcinol, 4,4'-dihydroxydiphenyl, 4,4'-dihydroxytriphenyl, 2,6-naphthalenediol, 4,4'-dihydroxydiphenyl ether, bis-(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, and 2,2-bis(4-hydroxyphenyl)methane as well as those substituted with alkyl and alkoxy groups and halogen atoms, such as chlorohydroquinone, methylhydroquinone, 1-butylhydroquinone, phenylhydroquinone, methoxyhydroquinone, 1-butylhydroquinone, phenylhydroquinone, methoxyhydroquinone, phenoxyhydroquinone, 4-chlororesorcinol, and 4-methylresorcinol.

Examples of the alicyclic diols include trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol as well as those substituted with alkyl and alkoxy groups and halogen atoms, such as trans-1,4-(1-methyl)cyclohexanediol and trans-1,4(1-chloro)cyclohexanediol.

Examples of the aliphatic diols include straight-chain or branched-chain aliphatic diols such as ethylene glycol, 1,3-propanediol, 1,4-butanediol, and neopentyl glycol.

Examples of the aromatic hydroxycarboxylic acids include 4-hydroxybenzoic acid, 3-hydroxybenzoic acid, 6-hydroxy-2-naphthoic acid, and 6-hydroxy-1-naphthoic acid as well as those substituted with alkyl and alkoxy groups and halogen atoms, such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2-chloro-4-hydroxy-benzoic acid, 2,3-dichloro-4-hydroxybenzoic acid, 3-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Examples of the aromatic mercaptocarboxylic acids include 4-mercaptobenzoic acid, 3-mercaptobenzoic acid, 6-mercapto-2-naphthoic acid, and 7-mercapto-2-naphthoic acid.

Examples of the aromatic dithiols include benzene-1,4-dithiol, benzene-1,3-dithiol, 2,6-naphthalenedithiol, and 2,7-naphthalenedithiol.

Examples of the aromatic mercaptophenols include 4-mercaptophenol, 3-mercaptophenol, 6-mercaptophenol, and 7-mercaptophenol.

Examples of the aromatic hydroxyamines and aromatic diamines include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxyphenylmethane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

The polymers (I) to (VIII) comprising the above-mentioned components may be divided into a group of those capable of forming the anisotropic molten phase and a group of those incapable of forming said phase according to the constituents, polymers composition, and sequence distribution. The polymers used in the present invention are limited to those of the former group.

Among the polymers capable of forming an anisotropic molten phase which are suitably used in the present invention, are the polyesters (I), (II), and (III), and polyesteramides (VIII) and said polymers can be prepared by reacting various ester forming processes wherein the organic monomers, each having a functional group which can form a desired recurring unit, by condensation with each other. The functional groups of these organic monomers include carboxyl, hydroxyl, ester, acryloxy, acyl halide, and amine groups. These organic monomers can be reacted by melt acidolysis in the absence of any heat exchange fluid. In this process, the monomers are heated to form a melt. As the reaction proceeds, the solid polymer particles are suspended in the melt. In the final stage of the condensation reaction, the reaction system may be evacuated to facilitate the removal of volatile by-products (e.g., acetic acid and water).

A slurry polymerization process may also be employed in the preparation of fully aromatic polyesters suitable for use in the present invention. In this process, the solid product is obtained in the form of a suspension thereof in a heat exchange medium.

In either of said melt acidolysis and slurry polymerization processes, organic monomeric reactants, from which fully aromatic polyesters can be derived, may be employed in the reaction in a modified form obtained by esterifying the hydroxyl group of the monomer at ambient temperature (i.e., in the form of their lower acyl esters). The lower acyl groups have preferably about 2 to 4 carbon atoms. Preferably, acetates of the organic, monomeric reactants are employed in the reaction.

Typical examples of the catalysts usable in both the melt acidolysis and slurry processes include dialkyltin oxides (such as dibutyltin oxide), diaryltin oxide, titanium dioxide, antimony trioxide, alkoxytitanium silicates, titanium alkoxides, alkali metal and alkaline earth metal salts of carboxylic acids (such as zinc acetate), Lewis acids (such as $BF_3$), and gaseous acid catalysts such as hydrogen halides (e.g., HCl). The catalyst is used in an amount of about 0.001–1 wt%, particularly about 0.01–0.2 wt%, based on the total weight of the monomer.

The fully aromatic polymers suitable for use in the present invention are substantially insoluble in ordinary solvents and, therefore, are unsuitable for use by solution processing. However, as described above, these polymers can be processed easily by an ordinary melt processing process. Particularly preferred fully aromatic polymers are soluble in pentafluorophenol to some extent.

The fully aromatic polyester preferably used in the present invention have a weight-average molecular weight of generally about 2,000–200,000, preferably about 10,000–50,000, particularly about 20,000–25,000. The fully aromatic polyesteramides preferably used have a molecular weight of generally about 5,000–50,000, preferably about 10,000–30,000, for example, 15,000–17,000. the molecular weight may be determined by gel permeation chromatography or other standard methods in which no polymer solution is formed, such as a method in which terminal groups of a compression-molded film are determined by infrared spectroscopy. In another method, the molecular weight of the polymer may be determined according to a light-scattering method after it is dissolved in pentafluorophenol.

When the fully aromatic polyester or polyesteramide is dissolved in pentafluorophenol at 60° C. to obtain a 0.1 wt% solution thereof, the solution has generally an inherent viscosity (I.V.) of at least about 2.0 dl/g, for example, about 2.0–10.0 dl/g.

The anisotropic molten phase-forming polyesters used in the present invention should preferably be aromatic polyesters and aromatic polyester amides. Other preferred examples include polyesters which containing aromatic polyester and aromatic polyesteramide in the same molecular chain.

These polyesters are constructed of compounds which are exemplified by naphthalene compounds such as 2,6-naphthalene dicarboxylic acid, 2,6-dihydroxynaphthalene, 1,4-dihydroxyhaphthalene, and 6-hydroxy-2-naphthoic acid; biphenyl compounds such as 4,4'-diphenyldicarboxylic acid and 4,4'-dihydroxybiphenyl; compounds represented by the following formula (I), (II), or (III).

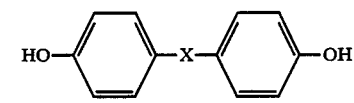
(I)

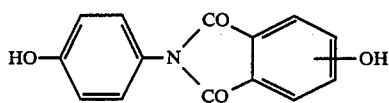
(II)

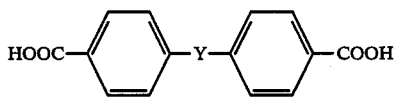
(III)

(where X is a group selected from $C_1$–$C_4$ alkylene, alkylidene, —O—, —SO—, —SO$_2$—, —S—, and —CO—, and Y is a group selected from —(CH$_2$)$_n$— (n=1–4) and —O(CH$_2$)$_n$O— (n=1–4).); para-substituted benzene compounds such as p-hydroxybenzoic acid, terephthalic acid, hydroquinone, p-aminophenol, and p-phenylenediamine, and nucleus-substituted benzene compounds (the substituent group being selected from chlorine, bromine, methyl, phenyl, and 1-phenylethyl); and meta-substituted benzene compounds such as isophthalic acid and resorcinol.

Preferred examples of polyesters partially containing the above-mentioned constituents in the same molecular chain include polyalkylene terephthalate, with the alkyl group containing 2–4 carbon atoms.

These polyesters contain as the essential constituents one or more of the above-mentioned naphthalene compounds, in which biphenyl compounds and para-substituted benzene compounds are particularly preferable. Among the para-substituted benzene compounds, p-hydroxybenzoic acid, methyl hydroquinone, and 1-phenylethylhydroquinone are particularly preferable.

The combination of the constituents are exemplified as follows:

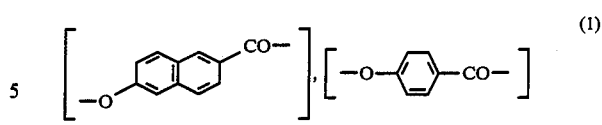
(1)

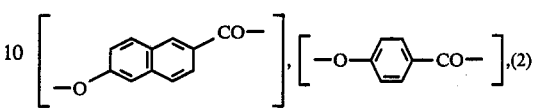
(2)

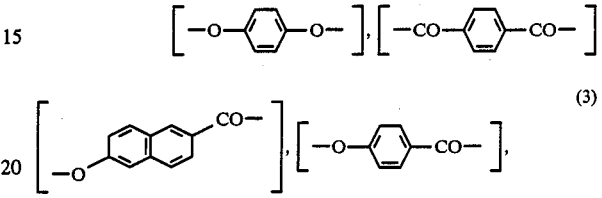
(3)

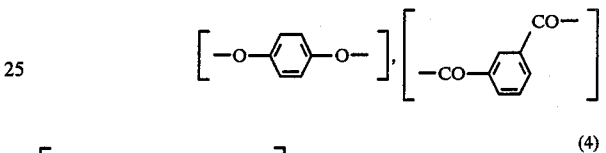
(4)

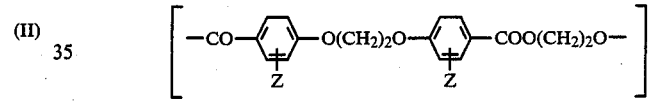
(5)

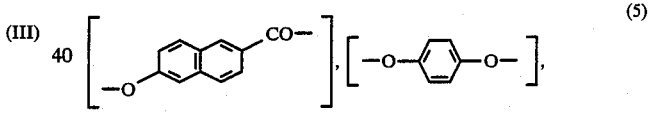

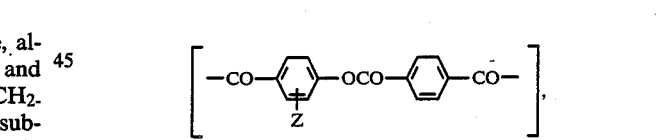

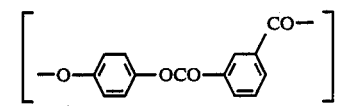

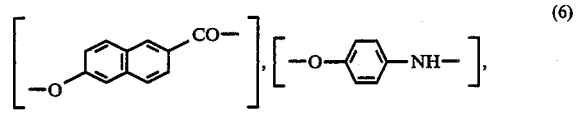
(6)

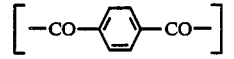
(7)

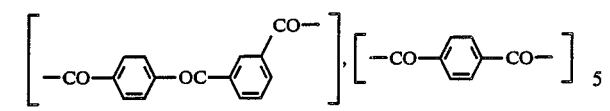, 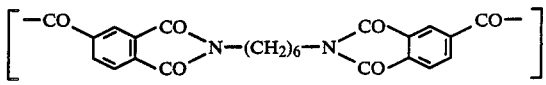
(8)
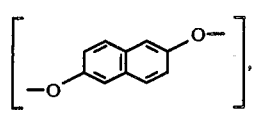,
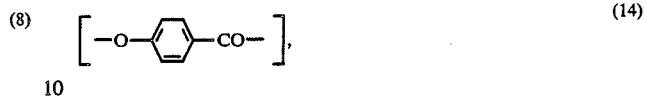
(14)
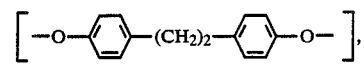,
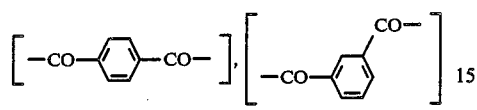
(9)
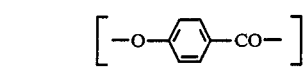,
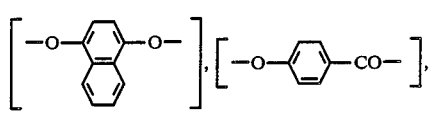, 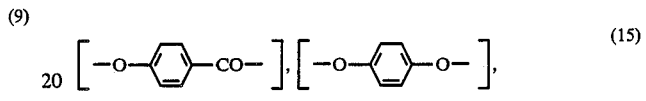
(15)
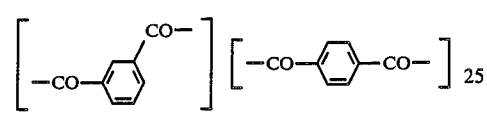
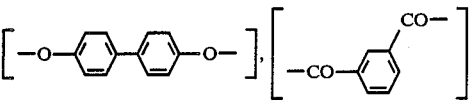,
(10)
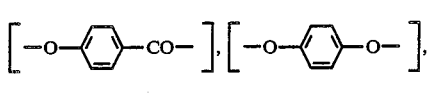, 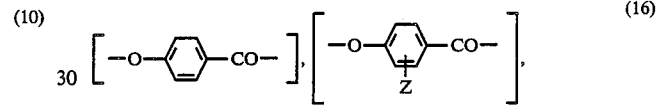
(16)
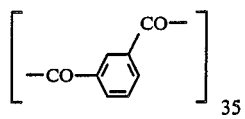,
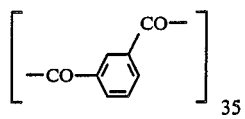, 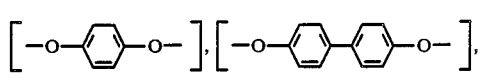
(11)
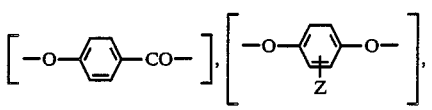,
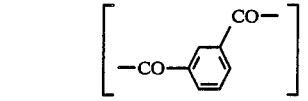
(17)
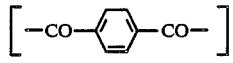,
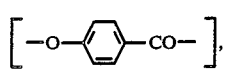
(12)
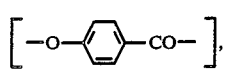,
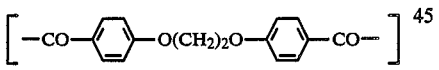,
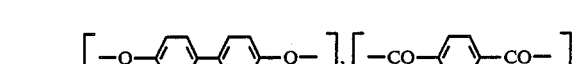
(13)
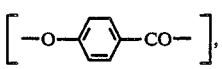,
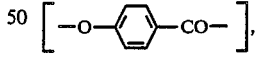
(18)
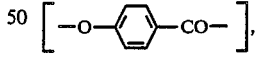,
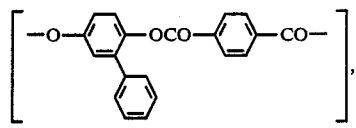,
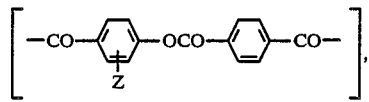, 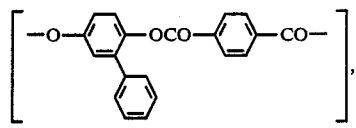
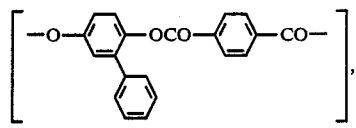,
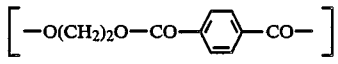,
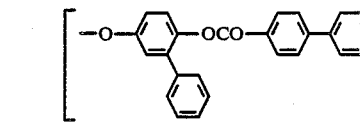,
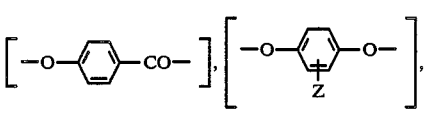, 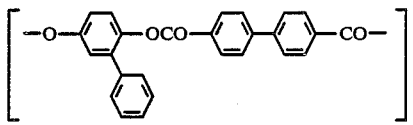
(19)
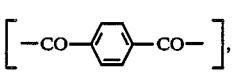, 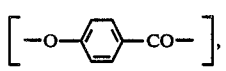
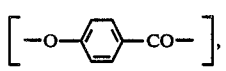,

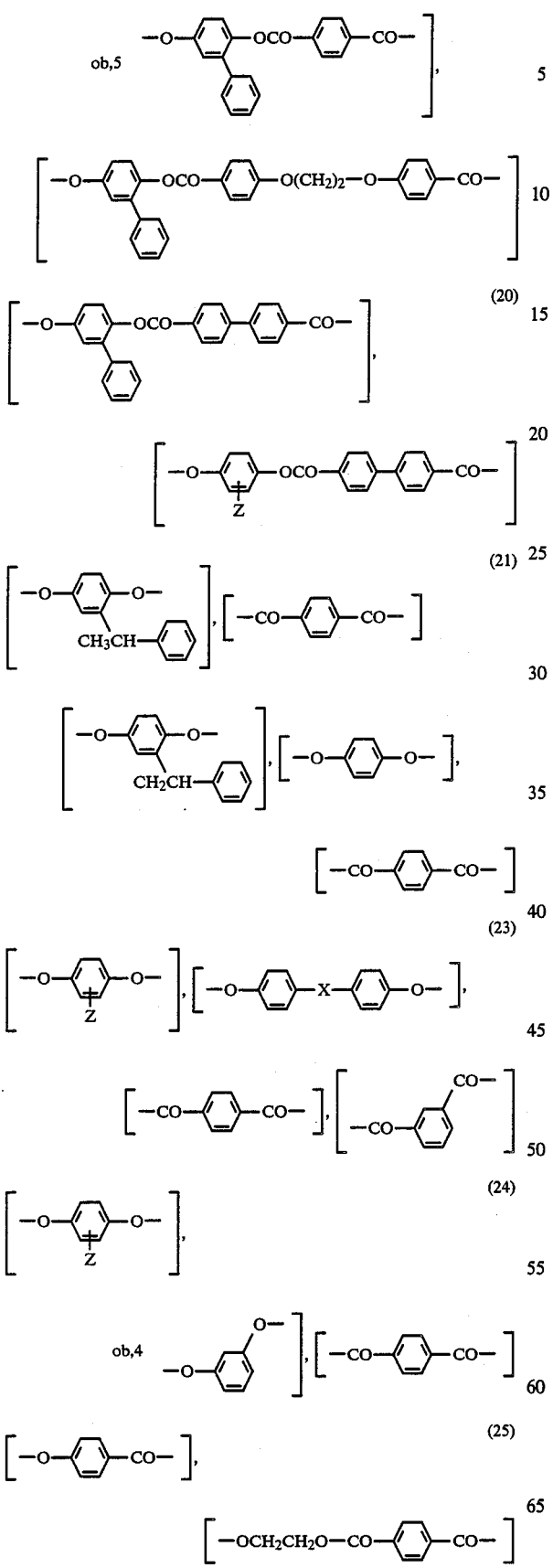

In the formulae, Z is a substituent group selected from —Cl, —Br, and —CH₃, and X is a substituent group selected from $C_1$–$C_4$ alkylene, alkylidene, —O—, —SO—, —SO₂—, —S—, and —CO—.

The particularly preferred anisotropic molten phase-forming polyesters used in the present invention are those containing at least about 10 mol% of a naphthalene moiety-containing recurring unit such as 6-hydroxy-2-naphthoyl, 2,6-dihydroxynaphthalene, and 2,6-dicarboxynaphthalene. Preferred polyesteramides are those having recurring units each comprising the above-mentioned naphthalene moiety and 4-aminophenol or 1,4-phenylenediamine moiety. Their examples are shown below.

(1) Polyester essentially comprising the following recurring units I and II:

These polyesters comprise about 10–90 mol% of unit I and about 10–90 mol% of unit II. In one embodiment, the amount of unit I is about 65–85 mol%, preferably about 70–80 mol% (for example, about 75 mol%). In another embodiment, the amount of unit II is about 15–35 mol%, preferably about 20–30 mol%. At least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and combinations thereof.

(2) Polyester essentially comprising the following recurring units I, II, and III:

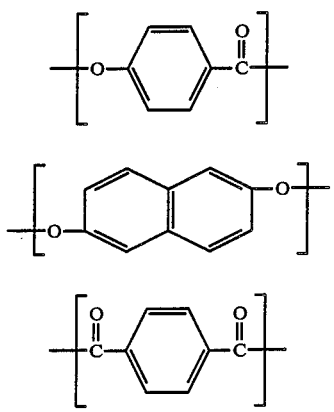

This polyester contains about 30–70 mol% of unit I. It comprises preferably about 40–60 mol% of unit I, about 20–30 mol% of unit II, and about 20–30 mol% of unit III. At least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and combinations thereof.

(3) Polyester essentially comprising the following recurring units I, II, III, and IV.

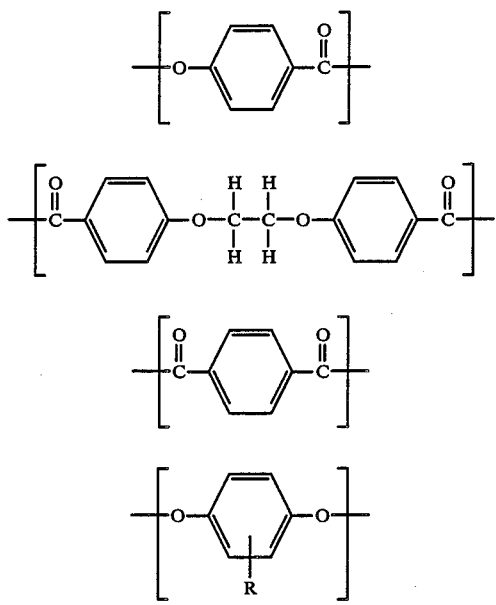

(wherein R represents a substituent for the hydrogen atom on the aromatic ring which is methyl, chlorine, bromine, or a combination thereof.) This polyester contains about 20–60 mol% of unit I, about 5–18 mol% of unit II, about 5–35 mol% of unit III, and about 20–40 mol% of unit IV. Preferably, it comprises about 35–45 mol% of unit I, about 10–15 mol% of unit II, about 15–25 mol% of unit III, and about 25–35 mol% of unit IV, provided that the total molar concentration of units II and III is substantially equal to that of unit IV. At least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and a combination thereof. When the fully aromatic polyester is dissolved in pentafluorophenol at 60° C. to obtain a 0.3 w/v% solution thereof, the solution is generally an inherent viscosity of at least 2.0 dl/g, for example, 2.0–10.0 dl/g.

(4) Polyester essentially comprising the following recurring units I, II, III, and IV:

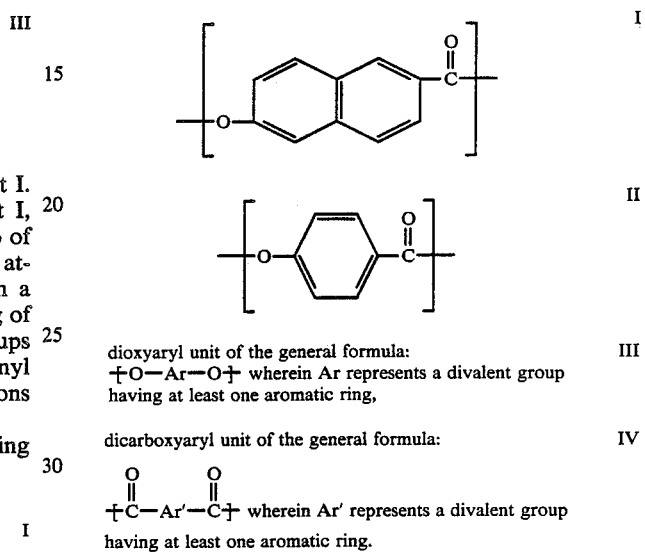

dioxyaryl unit of the general formula:  III
—(—O—Ar—O—)— wherein Ar represents a divalent group having at least one aromatic ring, dicarboxyaryl unit of the general formula:  IV $$-(-\overset{O}{\overset{\|}{C}}-Ar'-\overset{O}{\overset{\|}{C}}-)-$$ wherein Ar' represents a divalent group having at least one aromatic ring.

The amount of unit I is about 20–40 mol%. The amount of unit II is in excess of 10 mol% but up to about 50 mol%. The amount of unit III is in excess of 5 mol% but up to about 30 mol% and the amount of unit IV is in excess of 5 mol% but up to 30 mol%. This polyester comprises preferably about 20–30 mol% (for example, about 25 mol%) of unit I, about 25–40 mol% (for example, about 35 mol%) of unit II, about 15–25 mol% (for example, about 20 mol%) of unit III and about 15–25 mol% (for example, about 20 mol%) of unit IV. If necessary, at least a portion of the hydrogen atoms attaching directly to the ring may be replaced with a substituent group selected from the group consisting of alkyl groups having 1–4 carbon atoms, alkoxy groups having 1–4 carbon atoms, halogen atoms, a phenyl group, substituted phenyl groups, and a combination thereof.

The units III and IV should preferably be symmetrical in the sense that the divalent bonds connecting these units to adjacent units (on both sides) are arranged symmetrically on one or more aromatic rings (for example, when these units are on a naphthalene ring, they are arranged in positions para to each other or on diagonal rings). However, asymmetrical units derived from resorcinol and isophthalic acid may also be used.

A preferred dioxyaryl unit III is as follows:

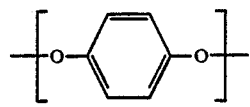

and a preferred dicarboxyaryl unit IV is as follows:

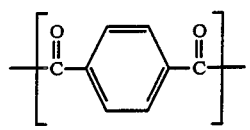

(5) Polyester essentially comprising the following recurring units I, II, and III:

I. 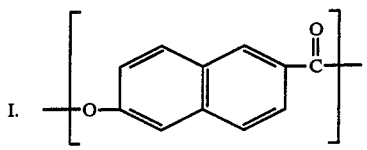

II. dioxyaryl unit of the general formula: ⁺O—Ar—O⁺
wherein Ar represents a divalent group having at least one aromatic ring, III. dicarboxyaryl unit of the general formula:

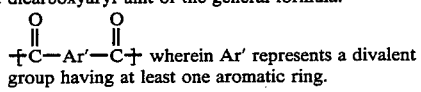 wherein Ar' represents a divalent group having at least one aromatic ring.

The amounts of units I, II, and III are about 10–90 mol%, 5 to 45 mol%, 5–45 mol%, and 5–45 mol%, respectively. This polyester comprises preferably about 20–80 mol% of unit I, about 10–40 mol% of unit II, and about 10–40 mol% of unit III. More preferably, it comprises about 60–80 mol% of unit I, about 10–20 mol% of unit II, and about 10–20 mol% of unit III. If necessary, at least a portion of the hydrogen atoms attaching directly to the ring may be replaced with a substituent group selected from the group consisting of alkyl group having 1–4 carbon atoms, alkoxy group having 1–4 carbon atoms, halogen atom, phenyl group, substituted phenyl group, and a combination thereof.

A preferred dioxyaryl unit II is as follows:

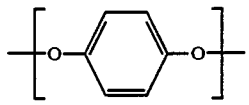

and a preferred dicarboxyaryl unit III is as follows:

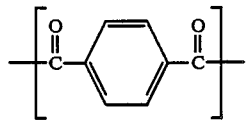

(6) Polyesteramide essentially comprising the following recurring units I, II, III, and IV:

I. 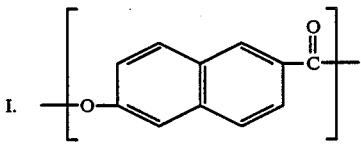

II. a unit of the general formula: $+\overset{O}{\overset{\|}{C}}-A-\overset{O}{\overset{\|}{C}}+$ wherein A represents a divalent group having at least one aromatic ring or a divalent trans-cyclohexane group, III. a unit of the general formula: ⁺Y—Ar—Z⁺ wherein Ar represents a divalent group having at least one aromatic ring, Y represent O, NH or NR, and Z represents NH or NR, R being an alkyl group having 1–6 carbon atoms or an aryl group, IV. a unit of the general formula: ⁺O—Ar'—O⁺ wherein Ar' represents a divalent group having at least one aromatic ring.

The amounts of units I, II, III, and IV are about 10–90 mol%, about 5–45 mol%, about 5–45 mol%, and about 0–40 mol%, respectively. If necessary, at least a portion of the hydrogen atoms attaching directly to the ring may be replaced with a substituent group selected from the group consisting of alkyl group having 1–4 carbon atoms, alkoxy group having 1–4 carbon atoms, halogen atom, phenyl group, substituted phenyl group, and a combination thereof.

A preferred dicarboxyaryl unit II is as follows:

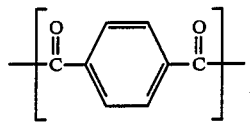

a preferred unit III is as follows:

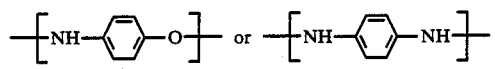

and a preferred dioxyaryl unit IV is as follows:

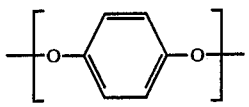

The anisotropic molten phase-forming polymers of the present invention include also polymer wherein part of the polymer chain comprises a segment of the above-mentioned anisotropic molten phase-forming polymer and the balance comprises a segment of a thermoplastic resin which does not form an anisotropic molten phase.

The composition of the present invention may be incorporated with various types of fillers for thermoplastic resins and thermosetting resins according to the intended applications. Examples of inorganic fillers include inorganic fibers such as glass fiber, carbon fiber, metallic fiber, ceramic fiber, boron fiber, potassium titanate fiber, and asbestos; powdery substances such as calcium carbonate, highly dispersible silicate, alumina, aluminum hydroxide, talc, clay, mica, glass flake, glass powder, glass beads, quartz sand, silica sand, wollastonite, metal powder, carbon black, barium sulfate, and calcined gypsum; granular and platy inorganic compounds such as silicon carbide, alumina, boron nitride, and silicon nitride; and whisker and metal whisker. Examples of fibrous fillers include aromatic polyamide fiber such as aramid fiber and fully aromatic polyester fiber; organic synthetic fiber such as phenolic resin fiber; and natural fibers such as cellulose fiber and jute. These fillers may be used individually or in combination with one another.

The filler should be added in an amount less than 70 wt% for good moldability. Particularly preferred fillers are PAN-based and pitch-based carbon fiber.

According to the present invention, a polyamide resin is used as a surface-testing agent, a collecting agent, or an additive. It is not specifically limited; but it includes nylon-6, nylon-66, nylon-11, nylon-12, copolymers thereof, and modified polyamides. A particularly preferred polyamide is a solvent-soluble nylon.

Examples of solvents for the nylon include alcohols, ketones, ethers, esters, aromatic hydrocarbons, and derivatives thereof. Preferred solvents are lower aliphatic alcohols such as methanol and ethanol.

Examples of the solvent-soluble nylon include commercial 6/66/610 terpolymer and 6/66/bis(4-aminocyclohexyl)methane-6 ("Ultramid" 1C, a product of BASF), which are produced by copolymerizing equal amounts of comonomers, and N-alkoxymethyl-modified nylon formed by reacting formalin and alcohol with nylon so that the hydrogen of the amide group is substituted.

The polyamide resin is incorporated into the composition in an amount of 0.05–10 wt% based on the amount of the filler. Polyamide resin less than 0.05 wt% does not produce the effect of the invention; and polyamide resin in excess of 10 wt% lowers the heat distortion temperature of the molded product. The preferred amount is 0.5–7.0 wt%.

The polyamide resin produces the effect of the present invention when it is incorporated as an additive into the liquid-crystalline polyester along with the filler. Preferably, it should be incorporated into the composition in the form of a surface treating agent which has previously been applied to the surface of the filler.

The surface treatment of the filler may be performed in the following manner.

(1) The polyamide resin is dissolved in a solvent, the solution is applied to the filler, and the solvent is removed.

(2) The polyamide resin is melted by heating, and the melt is applied to the filler. (Melt process)

It is also possible and desirable to use the polyamide in combination with the well-known surface treating agent and collecting agent. They include functional compounds such as epoxy compounds, isocyanate compounds, silane compounds, and titanate compounds.

When the liquid-crystalline polyester is incorporated with carbon fiber and polyamide (as an additive), the resulting composite material has a high tensile strength, high modulus, and low coefficient of linear expansion. When the liquid-crystalline polyester is incorporated with carbon fiber which has previously surface-treated with a polyamide resin (as a surface treating agent), the resulting composition is further improved in mechanical properties and thermal properties. The effect of surface treatment is remarkable in the case of PAN-based carbon fiber which has undergone oxidation treatment, because the polyamide firmly adheres to the carbon fiber and has a good affinity for the liquid-crystalline polyester. The polyamide resin used as a collecting agent greatly improves the handling characteristic of carbon fiber. Having a low bulk density, carbon fiber is difficult to incorporate into the liquid-crystalline polymer by melt-mixing with an extruder.

The composition of the present invention may be incorporated with well-known substances which are commonly added to thermoplastic resins and thermosetting resins. These substances are a plasticizer, antioxidant, UV light stabilizer, anti-static agent, flame retardant, dye and pigment, lubricant (to improve flowability and releasability), and nucleating agent. These substances are used according to the performance required.

In addition, the liquid-crystalline polyester of the present invention may be blended with any other thermoplastic resin within limits not deleterious to the object of the present invention.

The thermoplastic resin that can be blended includes polyolefins such as polyethylene and polypropylene; aromatic polyester such as polyethylene terephthalate and polybutylene terephthalate (compound of aromatic dicarboxylic acid and diol or hydroxy carboxylic acid); polyacetal (homo- or copolymer), polystyrene, polyvinyl chloride, polycarbonate, ABS, polyoxyphenylene oxide, polyoxyphenylene sulfide, and fluoroplastic. These thermoplastic resins may be used in combination with one another.

DETAILED DESCRIPTION OF THE INVENTION

The liquid-crystalline polyester resin composition of the present invention, which contains a filler and polyamide resin, has outstanding characteristics which include mechanical properties, thermal stability, low coefficient of molding shrinkage, and low coefficient of linear expansion. In addition, the composition can be easily handled when a filler is added.

EXAMPLES

The present invention is additionally illustrated but not limited by the following examples.

Examples 1 to 7 and Comparative Examples 1 to 5

An aromatic polyester resin A (mentioned later) is mixed with a prescribed amount of filler and additive (for surface treatment or collecting) as shown in Table 1. The mixture is melted and formed into pellets by using an extruder. The pellets are dried by using a hot-air dryer at 140° C. until the water content is lower than 100 ppm. The dried pellets are molded into test pieces by using an injection molding machine. The resulting test pieces are examined for physical properties according to the following ASTM test methods. The results are shown in Table 1.

Tensile strength, tensile modulus, tensile elongation: ASTM D638

Flexural strength: ASTM D790

Izod impact strength: ASTM D256

Heat distortion temperature (18.6 kgf/cm$^2$): ASTM D648

It is noted from Table 1 that the composition of the present invention is improved in mechanical properties, especially tensile modulus, flexural strength, and heat distortion temperature.

The same procedure as in Example 1 is repeated except that resin A is replaced by resins B, C, D, and E (mentioned later). The same results as in Example 1 are obtained.

The resins A to E used in the examples have the following constituents.

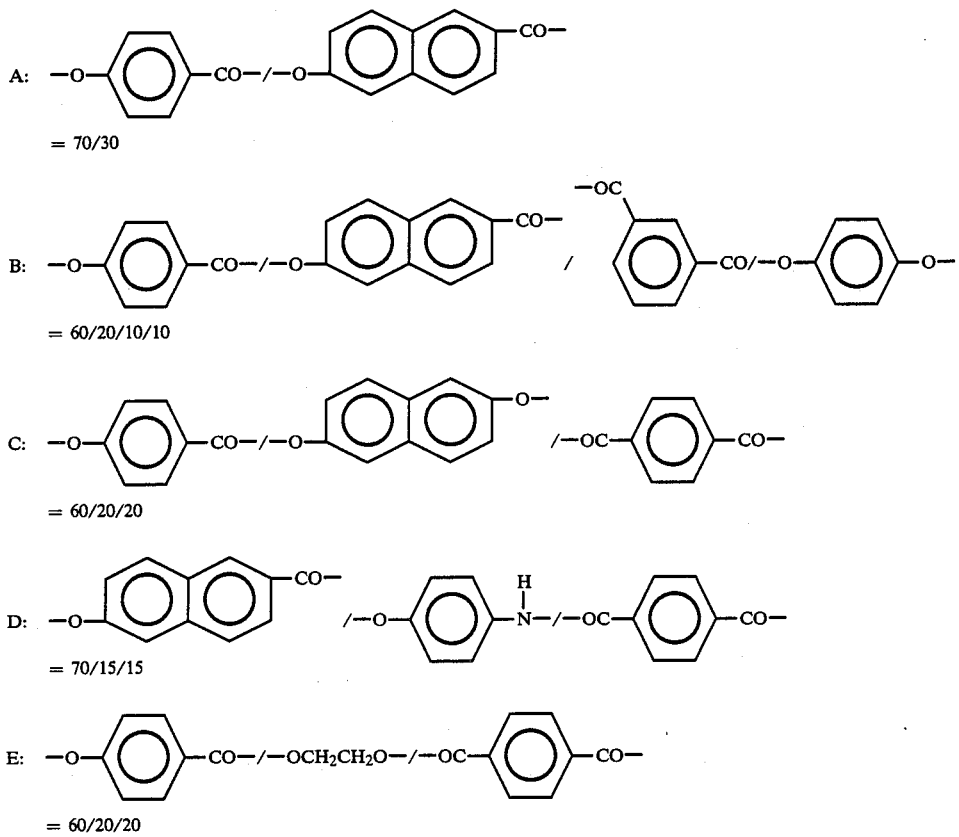

(The figures are in terms of molar ratio.)

TABLE 1

| Example | Filler | Amount*1 (wt %) | Additive | Amount*2 (wt %) | Tensile strength (kgf/cm²) | Tensile modulus (kgf/cm²) | Tensile elongation (%) | Flexural strength (kg/cm²) | Heat distortion temperature (°C.) |
|---|---|---|---|---|---|---|---|---|---|
| 1 | Carbon fiber | 30 | Nylon copolymer*4 | 3.0 | 2000 | 30 × 10⁴ | 1.3 | 2630 | 238 |
| 2 | Carbon fiber*3 | 30 | Nylon copolymer (for collecting) | 3.0 | 2210 | 32 × 10⁴ | 1.3 | 2762 | 238 |
| 3 | Carbon fiber*3 | 30 | Nylon copolymer*4 | 8.5 | 2080 | 29 × 10⁴ | 1.3 | 2590 | 223 |
| 4 | Carbon fiber*3 | 30 | Nylon-66 | 5.0 | 2071 | 29 × 10⁴ | 1.3 | 2530 | 235 |
| 5 | Carbon fiber*3 | 30 | Nylon-6 (for surface treatment) | 0.05 | 2059 | 30 × 10⁴ | 1.2 | 2480 | 239 |
| 6 | Glass fiber | 30 | Nylon copolymer*4 | 2.5 | 1540 | 16 × 10⁴ | 1.7 | 2200 | 241 |
| 7 | Wollastonite | 15 | Nylon copolymer*4 | 1.5 | 1900 | 13 × 10⁴ | 4.0 | 1480 | 190 |
| (1) | Carbon fiber | 30 | Epoxy resin | 3.5 | 1710 | 28 × 10⁴ | 1.1 | 2210 | 231 |
| (2) | Carbon fiber | 30 | Polyvinyl alcohol | 3.5 | 1680 | 28 × 10⁴ | 1.1 | 2190 | 231 |
| (3) | Glass fiber | 30 | Polyvinyl alcohol | 2.5 | 1380 | 15.8 × 10⁴ | 1.6 | 2090 | 238 |
| (4) | Wollastonite | 15 | Aminosilane coupling | 0.05 | 1440 | 13 × 10⁴ | 3.7 | 1400 | 186 |
| (5) | — | — | — | — | 2070 | 10 × 10⁴ | 3.1 | 1560 | 182 |

( ) Comparative Example
*1 Amount (wt %) based on the total amount of the composition.
*2 Amount (of additive for surface treatment or collecting) based on the amount of the filler.
*3 Chopped strand produced by carbonizing acrylonitrile fiber.
*4 Nylon-6/66/610 terpolymer.

What is claimed is:

1. A polyester composition comprising a blend of a polyester having an anisotropic phase, 1 to 70 percent by weight, based on the composition, of a filler and 0.05 to 10 percent by weight, based on the filler, of a polyamide, wherein prior to blending with the polyester, the surface of the filler is treated with the polyamide, or the polyamide is added to the filler.

2. The polyester composition of claim 1, wherein the filler is carbon fiber.

3. The polyester composition of claim 1, wherein the polyester comprises one or more aromatic hydroxy-carboxylic acids.

4. The polyester composition of claim 2, wherein the aromatic hydroxy-carboxylic acids are selected from 4-hydroxybenzoic acid, 3-hydroxy benzoic acid, 6-hydroxy-2-naphthoic acid, 6-hydroxy-1-naphthoic acid, 3-methyl-4-hydroxy benzoic acid, 3,5-dimethyl-4-hydroxy benzoic acid, 2,6-dimethyl-4-hydroxy benzoic acid, 3-methoxy-4-hydroxy benzoic acid, 3,5-dimethoxy-4-hydroxy benzoic acid, 6-hydroxy-5-methyl-2-naphthoic acid, 6-hydroxy-5-methoxy-2-naphthoic acid, 3-chloro-4-hydroxy benzoic acid, 2-chloro-4-hydroxy benzoic acid, 2,3-dichloro-4-hydroxy benzoic acid, 3,5-dichloro-4-hydroxy benzoic acid, 2,5-dichloro-4-hydroxy benzoic acid, 3-bromo-4-hydroxy benzoic acid, 6-hydroxy-5-chloro-2-naphthoic acid, 6-hydroxy-7-chloro-2-naphthoic acid, 6-hydroxy,5,7-dichloro-2-naphthoic acid or mixtures thereof.

5. The polyester composition of claim 1, wherein the polyester comprises one or more members selected from the group consisting of aromatic dicarboxylic acids, alicyclic dicarboxylic acids and mixtures thereof; and one or more members selected from the group consisting of aromatic diols, alicyclic diols, aliphatic diols and mixtures thereof.

6. The polyester composition of claim 5, wherein the aromatic dicarboxylic acids are selected from terephthalic acid, 4,4'-diphenyl dicarboxylic acid, 4,4'-triphenyl dicarboxylic acid, 2,6-naphthalene dicarboxylic acid, diphenyl ether-4,4'-dicarboxylic acid, diphenoxy ethane-4,4'-dicarboxylic acid, diphenoxy butane-4,4'-dicarboxylic acid, diphenyl ethane-4,4'-dicarboxylic acid, isophthalic acid, diphenyl ether-3,3'-dicarboxylic acid, diphenoxy ethane-3,3'-dicarboxylic acid, diphenyl ethane-3,3'-dicarboxylic acid, and naphthalene-1,6-dicarboxylic acid, chloro-terephthalic acid, dichloroterephthalic acid, bromo-terephthalic acid, ethyl terephthalic acid, methoxy terephthalic acid, ethoxy terephthalic acid, or mixtures thereof.

7. The polyester composition of claim 5, wherein the alicyclic dicarboxylic acids are selected from trans,1,4-cyclohexane dicarboxylic acid, cis-1,4-cyclohexane dicarboxylic acid, 1,3-cyclohexane dicarboxylic acid, trans-1,4-(1-methyl)cyclohexane dicarboxylic acid, trans-1,4-(1-chloro)cyclohexane dicarboxylic acid or mixtures thereof.

8. The polyester composition of claim 5, wherein the aromatic diols are selected from hydroquinone resorcinol, 4,4'-dihydroxy diphenyl, 4,4'-dihydroxy triphenyl, 2,6-naphthalene diol, 4,4'-dihydroxy diphenyl ether, bis-(4,hydroxyphenoxy)ethane, 3,3'-dihydroxy diphenyl, 3,3'-dihydroxy diphenyl ether, 1,6-naphthalene diol, 2,2-bis(4-hydroxyphenyl)propane, 2,2-bis(4-hydroxyphenyl)methane, alkyl-, alkoxy-, or halogen-substituted derivatives thereof or mixtures thereof.

9. The polyester composition of claim 5, wherein the alicyclic diols are trans-1,4-cyclohexane diol, cis-1,4-cyclohexane diol, trans-1,4-cyclohexane diol, trans-1,3-cyclohexane diol, cis-1,2-cyclohexane diol, and trans-1,3-cyclohexane dimethanol, trans-1,4-(b 1-methyl)cyclohexane diol, trans-1,4-(1-chloro)cyclohexane diol, or mixtures thereof.

10. The polyester composition of claim 5, wherein the aliphatic diols are selected from the ethylene glycol, 1,3-propane diol, 1,4-butane diol, neopentyl glycol or mixtures thereof.

11. The polyester composition of claim 5, wherein the polyester further comprises one or more aromatic hydroxy-carboxylic acids.

12. The polyester composition of claim 11, wherein the aromatic hydroxy-carboxylic acids are selected from 4-hydroxy benzoic acid, 3-hydroxy benzoic acid, 6-hydroxy-2-naphthoic acid, 6-hydroxy-1-naphthoic acid, 3-methyl-4-hydroxy benzoic acid, 3,5-dimethyl-4-hydroxy benzoic acid, 2,6-dimethyl-4-hydroxy benzoic acid, 3-methoxy-4-hydroxy benzoic acid, 3,5-dimethoxy-4-hydroxy benzoic acid, 6-hydroxy-5-methyl-2-naphthoic acid, 6-hydroxy-5-methoxy-2-naphthoic acid, 3-chloro-4-hydroxy benzoic acid, 2-chloro-4-hydroxy benzoic acid, 2,3-dichloro-4-hydroxy benzoic acid, 3,5-dichloro-4-hydroxy benzoic acid, 2,5-dichloro-4-hydroxy benzoic acid, 3-bromo-4-hydroxy benzoic acid, 6-hydroxy-5-chloro-2-naphthoic acid, 6-hydroxy-7-chloro-2-naphthoic acid, 6-hydroxy,5,7-dichloro-2-naphthoic acid or mixtures thereof.

13. The polyester composition of claim 5, wherein the polyester has a weight average molecular weight of from about 2,000-200,000.

14. The polyester composition of claim 5, wherein the polyester comprises about 10 mol% or more of 6-hydroxy-2-naphthalene, 2,6-dihydroxy naphthalene, 2,6-dicarboxy naphthalene or mixtures thereof.

15. The polyester composition of claim 1, wherein the polyester is a member selected from (a) a polyester containing about 10 to 90 mol% of units of

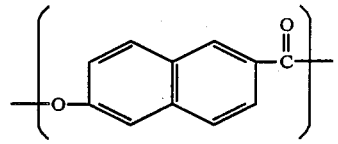

and about 10 to 90 mol% of units of

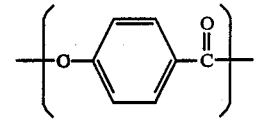

(b) a polyester containing about 40-60 mol% of units

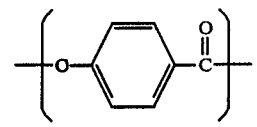

about 20-30 mol% of units of

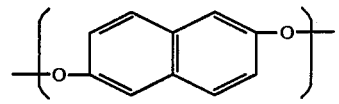

about 20-30 mol% of units of

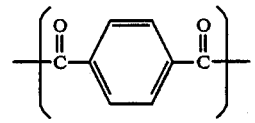

(c) a polyester containing about 20-60 mol% of units of about 5–18 mol% of units of

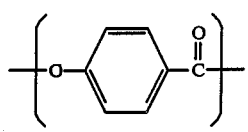

about 5–35 mol% of units of

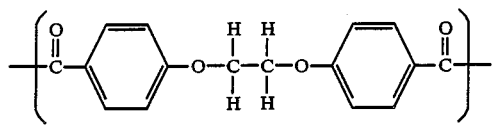

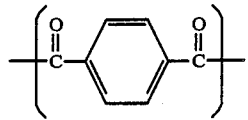

and about 20–40 mol% of unit of

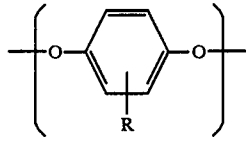

wherein R represents methyl, chloro, bromo or mixtures thereof, (d) a polyester containing about 20–40 mol% of units of

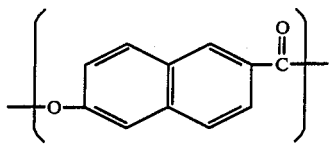

about 10 mol%–50 mol% of units of

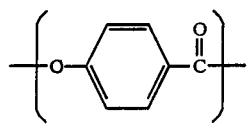

about 5–30 mol% of dioxyaryl units of (O—Ar-O), wherein Ar represent a bivalent group containing at least one aromatic ring; and about 5–30 mol% of dicarboxyaryl units of

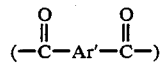

wherein Ar' represents a bivalent group containing at least one aromatic ring, or (e) a polyester containing 10–90 mol% of units of

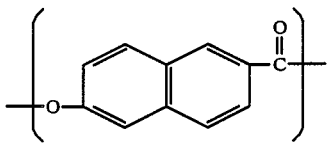

about 5–45 mol% of dioxyaryl units of O—Ar—O wherein Ar denotes a bivalent group including at least one aromatic ring, and about 5–45 mol% dicarboxyaryl units of

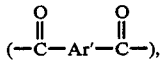

wherein Ar' denotes a bivalent group including at least one aromatic ring.

16. The polyester composition of claim 1, wherein the polyamide is nylon-6, nylon-66, nylon-11 or nylon 12.

17. The polyester composition of claim 1, wherein the polyamide is a solvent-soluble polyamide.

* * * * *